Patented July 15, 1930

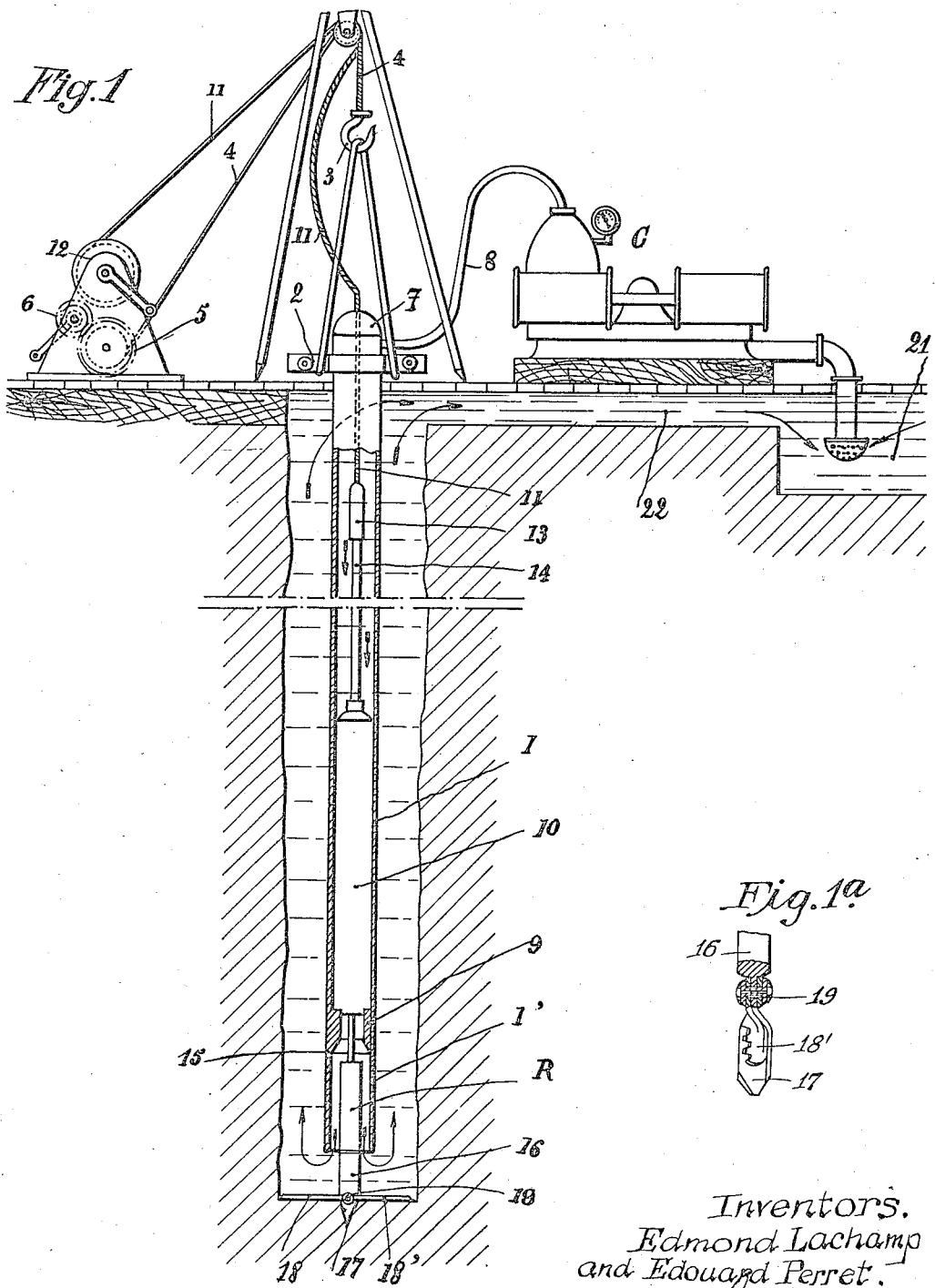

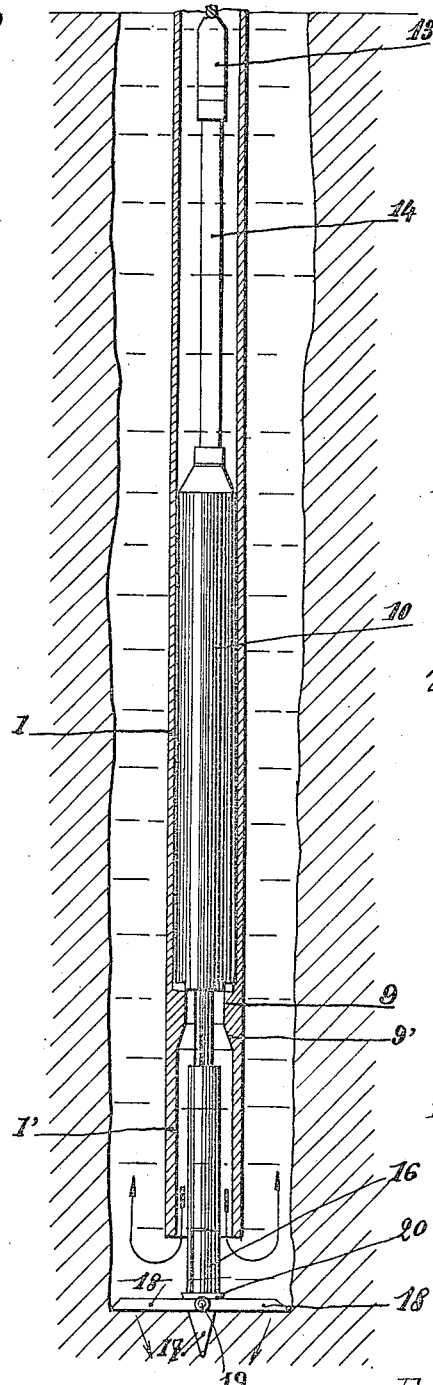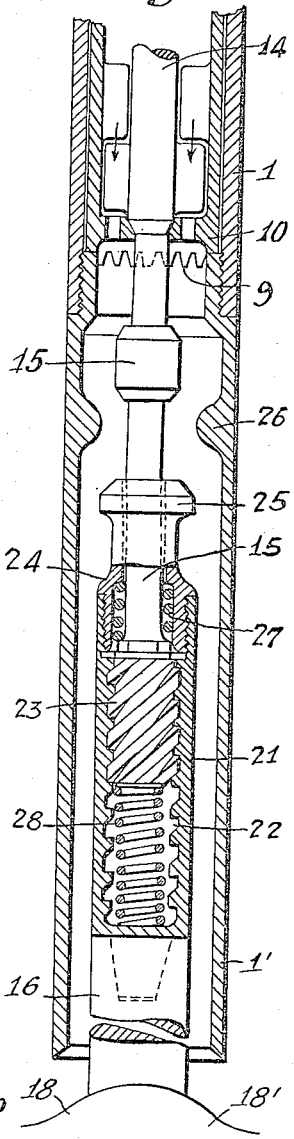

1,770,488

UNITED STATES PATENT OFFICE

EDMOND LACHAMP, OF VIENNA, AUSTRIA, AND EDOUARD PERRET, OF GENEVA, SWITZERLAND

DEEP-BORING APPARATUS

Application filed March 26, 1926, Serial No. 97,806, and in France November 13, 1925.

The invention relates to improvements in deep-boring apparatus and more especially to deep-boring apparatus of the type in which the boring tool is actuated by a hydraulic motor disposed at the bottom of the bore hole. The object of the invention is to render the motor and the tool independent from the piping column as well as from any other supporting device, and to allow same to be lifted to the surface level together with its boring tool without taking down or dismantling the piping column or disturbing any other power transmission means, and again to lower the motor with its tool upon its fixed seat in the tubing shaft.

The principal object of the invention is to provide a combined motor-boring tool regulator set suspended by a cable and resting at the foot of a well or tubing column of which it is independent except when rotating or during its operation, said combined motor-boring tool regulator set being adapted to be withdrawn from the shaft as desired and without dismantling the latter.

The motor is driven by the water which is sent through the piping column to the bed level and which returns to the surface level outside of the piping column, drawing along mud particles. In a more general way the invention is characterized by a hydraulic motor controlling the operation of the boring tool while the piping column, which is securely held against rotary movement, is used as a fluid power transmitting medium and as supporting means for the rotating boring apparatus. Deep-boring apparatus with hydraulic power transmission to the motor are known, the latter being placed at the bottom of the bore hole, but operating under entirely different conditions, the motor being stationary in respect to the column and not removable; consequently the motor could not be removed to the surface level without dismantling the column. The essential feature of the present invention resides in the fact that the entire apparatus, the motor and the boring tool can be lifted to the surface level without disturbing the column. Therefore, the boring tools can be readily and most easily be introduced at any phase of the boring operation, which is practically impossible with the known apparatus, and prospecting operations are greatly facilitated.

The invention further provides the use of a mechanical or automatic torque regulator, interposed between the motor and the boring tool, whereby the pressure exerted by the tool upon the bed is regulated so that the penetration of the tool during a given time unit will be reduced proportionally to the resistance encountered by the tool, with the result that the power absorbed by the motor will remain constant and stopping of the latter will be prevented.

The annexed drawing shows in a more or less schematical manner one embodiment of the invention.

Figure 1 is a general view in which the piping column is shown in vertical section.

Figure 1a is a partial side view of the boring cutters.

Figure 2 is a partial view of the lower portion of the column with the boring tool in working position.

Figure 3 is a vertical section through a torque regulator.

A hermetically joined shaft column 1, which of course is composed of inter-engaging sections, is suspended by means of an appropriate device 2 and, a vertically movable hook 3 of a tackle and the cable 4 which is wound upon the drum 5 of a lifting gear 6; the piping column can thus be progressively lowered according to the penetration of the boring tool, while its rotation about itself is prevented by appropriate guiding means. The column is closed at its upper end by a removable cap 7 connected by a conduit 8 to the compressor G. The heel, or lower column section 1' is provided with an abutment 9, the upper part of which is provided with teeth or claws, or any other appropriate interlocking means.

This abutment 9 is adapted to carry the housing of a hydraulic turbine 10, the inner or lower face of which is provided with teeth, claws or the like, adapted to engage those of the abutment 9 whereby the rotation of the turbine housing is prevented. After taking off the cap 7, the turbine is lowered into the column by means of a cable 11 mounted upon the drum of the winch 12. One end of the cable is connected to the turbine by means of a fitting 13 and a metallic rod 14. In the position shown in Figure 1 the turbine reposes upon its seat and the cable 11 is consequently slack; this cable passes tightly through an aperture of a stuffing box provided in the closing cap 7. The rotatable shaft 15 of the turbine 10 carries the boring tool holder 16 with guiding point 17 and tools 18, 18' which latter may be folded downwardly around a pivot 19; the boring apparatus and its parts are dimensioned to pass freely through the restricted section formed by the abutment 9; the cutting tools 18, 18' are foldable about said pivot in one direction, while their pivoting movement in the opposite direction is limited by one or several stops 20.

After the piping column is in place, the turbine 10 with its boring apparatus is lowered into the column until it strikes its seat 9 where it engages the teeth provided upon the latter. The closing cap 7 is then screwed into place, and the aperture for the passage of the cable 11 is closed tightly, whereupon the compressor pump G is set in action; the pump draws the water from the basin 21 and presses the same into the column 1. The liquid under pressure operates the turbine and the boring tool 16, the water escapes at the foot of the column, and carrying along mud particles, returns to the surface level as indicated by the arrows, to flow back through the channel 22 into the stand basin 21.

The boring tool, guided by its central point 17, due to the effect of the rapidly rotating tools 18, penetrates progressively into the ground. After the bore hole has been sunk sufficiently, a new section is added to the piping column in the usual manner, the cap 7 is reset in place and the operation can then be resumed.

The withdrawal of the tool is effected as follows. The turbine is lifted by means of the cable 11 passing through the aperture of the cap 7; the boring device ascends together with the turbine while the cutting tools 18, 18' fold up so as to permit their passage through the restricted section 9, the lower portion of which is cone shaped in order to facilitate the passage of the tools.

One feature of the invention consists in the disposition permitting the boring tools to rotate at high speed while exerting but a low pressure upon the bed. This pressure is kept substantially constant by a torque regulator of any appropriate design R preferably mounted between the tool holder 16 and the motor shaft 15 (turbine or other hydraulic motor).

Figure 3 shows a mechanical regulator in section. As described above, 1' represents the heel or lower column section carrying and engaging by its claws 9 the turbine housing 10; between the turbine shaft 15 and the boring tool holder 16, a regulator body 29, forming an integral part of said set is provided. The inside of this regulator body is provided with helicoidal threads 30, having a rise of approximately 45° which are engaged by a screw 23 connected to the shaft 15; at its upper portion the regulator body 29 carries a guiding sleeve 24 with enlarged head section 25 which freely surrounds the shaft 15. A spring 27 is lodged between the guiding part 25 and a collar upon the motor shaft 15, whereby any shock that may occur due to a sudden descent of the apparatus upon the bed will be deadened. Another spring 28, equalizes the torque action of the motor under normal running conditions.

The apparatus is therefore in equilibrium as long as the resisting forces encountered by the cutting tools remain below the value at which the motor is normally operating, and the screw 23 will occupy the position shown in Figure 3; on the other hand, if the resisting force increases, the working speed of the boring tool holder 16 is lowered, and this momentary difference in angular speed causes a slight rise of the regulator body 29 and the boring tool, the blades of which will consequently become more or less disengaged. In this manner a position of variable equilibrium is established depending upon the resisting conditions of the ground, but in which the motor constantly turns at normal speed. When the resistance is such as to suddenly stop the boring tool, the regulator body 29 ascends to such height that its upper portion 25 will penetrate into the narrow passage 26 of the lower column section 1' and obstruct the passage of the liquid; as a result, the pressure upon the water sent through the column will be increased and thus give warning to the machinist above of the prevailing conditions at the ground level; this increase of pressure might, if desired, be automatically used to actuate the winch by means of a servo-motor mechanism (not shown).

What we claim is:—

1. In a deep-boring apparatus, comprising a tubing shaft column, a feed water supply in said column, a tool with its holder and a hydraulic motor forming a set disposed for free back and forth movement within said shaft column, said tool being provided with foldable cutting blades, a fixed seat in said column, interlocking means upon said seat and upon the stator of the motor securely holding the stator against rotary movement, a suspension cable for said hydraulic motor-boring tool set, and means interposed between the rotor shaft and the boring tool, said means comprising a regulator controlling and regulating the torque upon the boring tool.

2. In a sounding device with hydraulic motor disposed within a hollow bore shaft column whereby the pressure feed water is fed from above to said motor directly through said shaft column comprising a boring tool mounted on the rotor of said hydraulic motor, a support provided in the lower part of said column, a corresponding part formed upon the stator of the motor adapted to be engaged by said support, means provided upon said support and corresponding part to securely interlock said parts against rotary movement, said support being adapted to absorb the torque of the motor, and a cable to bodily remove only the set formed by said motor and its boring tool.

3. In a sounding device of the class described, in combination, a bore shaft column, a cable extending within the bore shaft column, an hydraulic motor and a boring tool forming a movable set within said column and connected to said cable, an inwardly protruding seat upon said shaft column securely holding the motor housing against rotary movement and supporting said set of the motor and its boring tool while in its lowered position, and means to permit variations of length between the motor housing and the boring tool.

4. In a sounding device of the class described, in combination, a bore shaft column, a cable extending within the bore shaft column, an hydraulic motor and a boring tool forming a movable set within said column and connected to said cable, an inwardly protruding seat upon the shaft column securely holding the motor housing against rotary movement and supporting said set while in its lowered position, and a regulator of known type with helicoidal screw inserted between the motor housing and the boring tool to permit variations of length between the motor housing and the boring tool and to regulate the pressure of the cutting tool upon the ground.

In testimony whereof we have signed our names to this specification.

EDMOND LACHAMP.
EDOUARD PERRET.